July 29, 1969  F. E. TRUDEAU  3,457,721
SELF-LOCKING RIVETLESS CHAIN
Filed Dec. 19, 1967  2 Sheets-Sheet 2
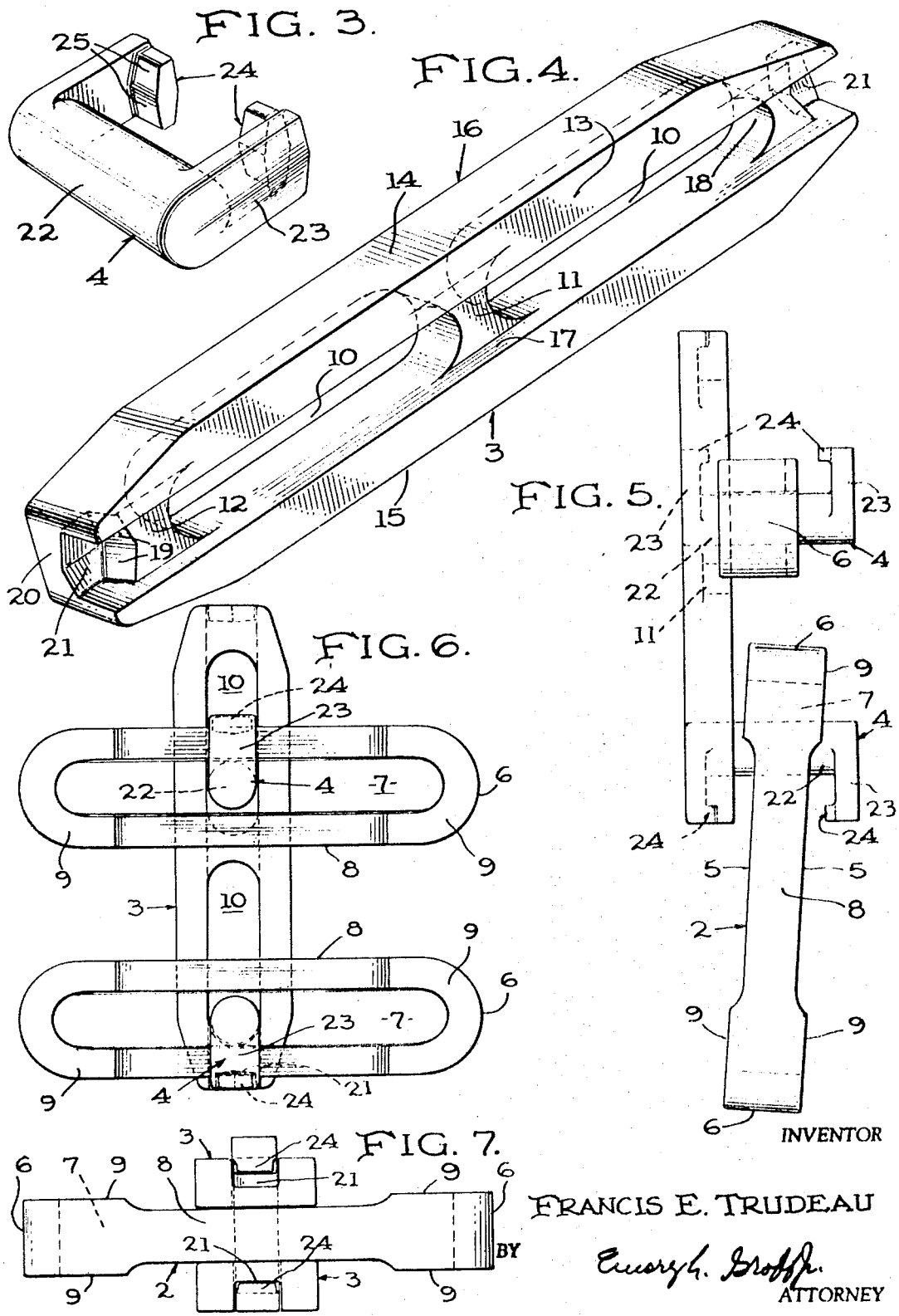
INVENTOR
FRANCIS E. TRUDEAU
BY Emory L. Groff Jr.
ATTORNEY

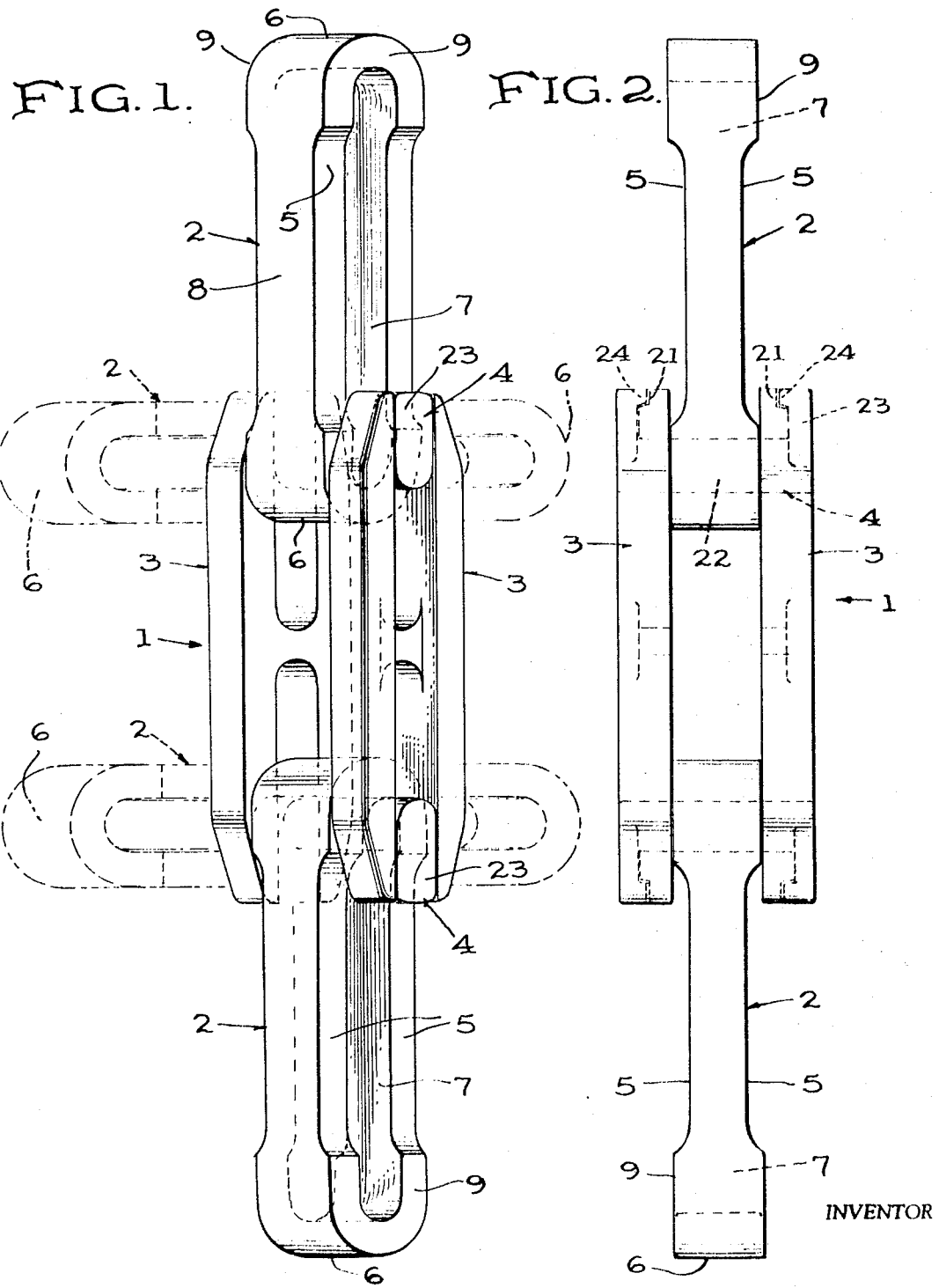

United States Patent Office 3,457,721
Patented July 29, 1969

3,457,721
SELF-LOCKING RIVETLESS CHAIN
Francis E. Trudeau, Chicago Heights, Ill., assignor to Portec, Inc., a corporation of Delaware
Filed Dec. 19, 1967, Ser. No. 691,794
Int. Cl. F16g 13/06, 13/08
U.S. Cl. 59—85                                    7 Claims

ABSTRACT OF THE DISCLOSURE

A chain comprising a center link pivotally attached at its ends to a pair of side bars by means of a self-locking rivetless connector. A pair of inwardly directed locking lugs on the connector cooperate with mating recess on the outer surface of each side bar and when fully assembled provide a flush outer chain surface.

---

This invention relates generally to rivetless chains, and more particularly to self-locking and separable rivetless chain which has wide application for use in conveyors, mining machinery and other industrial apparatus.

In addition to the high degree of strength exhibited by this type of chain, its principal features are its adaptability as a sprocket chain, the absence of rivets, and the ease with which individual links may be removed from or added to the chain. The subject type of chain comprises a center link consisting of an integral piece of metal, each end of which is joined to a pair of spaced apart elongated side bars by means of a self-locking transverse pin. By means of the present arrangement, assembly and disassembly of any one of the three components forming the chain may be readily effected without the use of any special tools or appliances.

Accordingly, one of the primary objects of the present invention is to provide a chain assembly comprising a center link and spaced apart side bars which are retained in operating position by means of an improved pin member of the self-locking type.

Another object of the present invention is to provide a self-locking rivetless chain including an improved side bar, each end of which is provided with a transverse and open ended recess which cooperates with mating lugs provided on a self-locking pin to retain the chain assembly in position.

Still another object of the present invention is to provide a self-locking rivetless chain including side bars provided with locking recesses at the ends thereof for reception of self-locking pins and including means to provide a completely flush assembly on the outer surfaces thereof when the chain is in position for use.

With these and other objects in view which will more readily become apparent as the nature of the invention is better understood, the invention resides in the novel construction, arrangement and combination of parts hereinafter more fully described, illustrated and claimed.

A preferred and practical embodiment of the invention is illustrated in the following drawings in which:

FIGURE 1 is a perspective view of the present invention disclosing in full lines a complete chain link assembly comprising two side bars, two center links and a pair of locking pins, and illustrates the position of the center links in broken lines as they would appear prior to the final step of assembly.

FIGURE 2 is a top plan view of the assembled chain assembly of FIGURE 1.

FIGURE 3 is a top perspective view of the locking pin as used in the present invention.

FIGURE 4 is a top perspective view of the side bar of the present invention.

FIGURE 5 is a top plan view illustrating the manner of assembling two center links.

FIGURE 6 is a side elevation of the components shown in FIGURE 5 prior to the assembly of a second side bar.

FIGURE 7 is an end elevation of the components of the chain prior to the final movement of assembly.

Similar reference characters designate corresponding parts throughout the several views of the drawings.

Referring now to the drawings, particularly FIGURE 1, it will be seen that the present invention comprises a plurality of components which when assembled provide a complete chain link assembly as shown in this figure. This complete chain link assembly, which is generally designated 1, comprises a pair of center links 2 which are pivotally attached at their opposing end to a pair of outermost side bars 3—3 by means of a pair of connector pins 4—4.

Each center link 2 consists of an integral piece of metal having a pair of laterally spaced side walls 5 joined at their ends by curved end walls 6, said side and end walls enclosing or surrounding an elongated slot 7. The intermediate section along the major axial length of each center link 2 is of reduced transverse dimension to provide a shank portion 8 which will be seen to be bounded at either end thereof by the greater dimension of the ends of the center link, which ends may be defined as bosses 9, the two side walls of which will be understood to be parallel.

Each of the side bars 3 comprises a longitudinal integral metal member having a pair of elongated slots 10 separated by an intermediate center web 11 and bounded at the extremities thereof by an end web 12. The details of the side bars 3 will be most clearly seen in FIGURE 4 of the drawings, wherein it will be noted that the outside surfaces 13 of both the top 14 and bottom 15 sections of the side bar are disposed in a single vertical plane. Also of interest is the fact that the outer surface of the center web 11 as well as the outer surfaces of each of the end webs 12—12 are spaced inwardly of the outside surfaces 13 of the top 14 and bottom 15 sections of the side bar, while the opposite or inner surfaces of each of the above three mentioned webs will be understood to be disposed in a single plane not too distant from the inside surface 16 of the side bar for reasons which will become apparent hereinafter. Thus, it will be apparent that, in effect, an outside cutout 17 extends the entire axial length of each side bar 3 on the outside thereof and extends unrestricted past both ends of the side bar. As will be seen in FIGURE 4, the end webs 12—12 are provided with an arcuate bearing surface 18 at one end which forms the outer end of each of the elongated slots 10—10, while the opposite portion of each end web 12, which is spaced inwardly from the free end of the side bar 3, comprises in part a pair of inside bevelled surfaces 19—19, the planes of which are perpendicular to the longitudinal axis of the side bar 3.

The inside surface 16 of the side bar extends to the very ends of the bar to provide an end nose 20, and this end nose together with the ends of the top 14 and bottom 15 sections and the aforedescribed inside bevelled surfaces 19—19 will be seen to provide a transverse open end recess 21 adjacent the ends of the outside cutout portion 17 on each bar.

The third component of the present invention is the connector pin 4, which is substantially U-shaped, and comprises a transverse cross bar 22 having a circular cross section, the radius of which is substantially identical to the radius of the arcuate bearing surface 18 at the ends of the two elongated slots 10—10. Extending at right angles from each end of the transverse cross bar 22 are a pair of spaced apart and parallel legs 23—23 having a pair of inwardly facing locking lugs 24—24 on the inner surfaces of their free ends. The details of the construction of the connector pin 4 will be apparent from a review of FIGURE 3 of the drawings, wherein it will be seen that each lug 24 is formed to provide a pair of outside bevelled surfaces 25—25 on that portion of the lug juxtaposed the transverse cross bar 22.

The novelty of the present invention will be more readily appreciated when considering the manner of assembling the abovedescribed three components to provide the chain link assembly 1 shown in FIGURES 1 and 2 of the drawings. Initially, a pair of connector pins 4—4 are positioned with respect to one side bar 3 as shown in FIGURE 5. In this respect, it will be understood that the height or vertical dimension of the elongated slots 10 will be slightly greater than the height of the cross bar 22 and legs 23 of the connector pin 4 to permit passage of the connector pins through these slots 10—10. Each of the connector pins are inserted through the slots 10—10 with the free ends of the legs 23 disposed toward the end noses 20—20 of the side bar. One of the connector pins 4 is moved toward the adjacent end of the side bar until the rounded portion of the transverse cross bar 22 meets with the juxtaposed arcuate bearing surface 18 of the end web 12 and thereafter is moved transversely to engage the lug 24 with the transverse open end recess 21, whereby it will be seen that the outside bevelled surfaces 25 of this lug 24 will mate with the inside bevelled surfaces 19 of the side bar recess. In this position, a completely flush relationship will exist between the outer surface of the leg 23 and the adjacent outside surfaces 13 of the side bar inasmuch as the thickness of the leg 23 has been selected to substantially correspond to the transverse dimension of the outside cutout 17 disposed adjacent the end web 12.

With one of the connector pins 4 thus seated at the end of the side bar 3, a center link 2 is positioned as shown in FIGURE 5 by placing its elongated slot 7 about the transverse cross bar 22 of the lowermost connector pin 4. Following the above, a second center link 2 is positioned about the other connector pin 4 which is loosely disposed adjacent the center web 11 of the side bar 3.

With the two connector pins thus disposed with respect to one side bar 3, the two respective center links 2—2 are positioned as shown in FIGURE 6 of the drawings. The important feature of this positioning is that the side walls 5 of the shank portions 8 of the two center links are disposed in overlying relationship to the inside surfaces 16 of the side bar, which in effect reduces the effective transverse thickness of the center link as will be seen in the case of the uppermost center link that is shown in FIGURE 5. With the components positioned as shown in FIGURE 6, a second side bar 3 is disposed in overlying relationship to the first described side bar with the two uppermost legs 23—23 of the connector pins entering the respective elongated slots 10—10 of the second side bar. To initially insert the uppermost legs 23—23 of the connector pins into the slots 10 of the second side bar, it will be apparent that the second bar will be slightly longitudinally offset from the underlying side bar to enable the two legs 23—23 to clear the slots 10—10, whereafter the second side bar will be moved upwardly to permit the uppermost leg 23 and its related lug 24 of the lower connector pin 4 to pass through the outside cutout 17 of the top side bar and be disposed over the transverse open end recess 21 thereof. Following the foregoing operation, the assembly will appear as in FIGURE 7 of the drawings, wherein it will be understood that the two center links will still be disposed at right angles to the two side bars, such as shown in broken lines in FIGURE 1. To lock the assembly into operating position the two center links are moved outwardly to the very limits of the related slots 17 and also pivoted 90 degrees toward the outermost portions of the side bars 3—3, which operation causes a lateral displacement of said side bars due to the camming effect as the larger transverse width of the bosses 9—9 at each end of the center links spreads the two juxtaposed side bars outwardly. The effect of the foregoing operation is to securely lock the lugs 24—24 of each connector pin 4 into the related recesses 21 at each end of each side bar, whereupon it will be apparent that a rigid pivotal connection is achieved and the chain link assembly 1 such as shown in FIGURES 1 and 2 will be ready for use without the necessity of employing any additional fastening means to retain the various components in a fully locked condition.

I claim:
1. A chain assembly including a center link having a pair of side bars disposed on both sides thereof, connector pin passing through said center link and pair of side bars to provide a pivotal attachment therebetween, said connector pin comprising an integral member including a cross bar having a pair of spaced apart parallel legs extending normal to said cross bar, a lug projecting inwardly from the free end of each said leg, means on the end of each said side bar receiving said lug on each said leg, and means on said center link movable into position about said cross bar and urging said side bars apart to seat said lugs into said receiving means.

2. A chain assembly according to claim 1, wherein, said side bars each include a longitudinal top and bottom section spaced apart from each other, a web adjacent each end of said sections joining same together, a bearing surface on one side of each said web adapted to mate with said connector pin cross bar, and said receiving means for said lugs disposed on the side of said webs opposite said bearing surface.

3. A chain assembly according to claim 2, wherein, the outside surface of said webs are recessed from the outside surface of said top and bottom sections and the transverse thickness of said connector pin legs substantially equals the depth of said recesses to provide a flush assembly.

4. A chain assembly according to claim 2, wherein, said receiving means includes a surface on said webs disposed adjacent to and spaced from the ends of said side bars.

5. A chain assembly according to claim 4, wherein, said receiving means surface comprises a pair of inside bevelled surfaces, and said connector pin lugs each include a pair of outside bevelled surfaces adapted to mate with said inside bevelled surfaces.

6. A chain assembly according to claim 5, wherein, each end of each said side bar includes a nose portion disposed laterally adjacent said receiving means.

7. A chain assembly according to claim 2, wherein, said connector pin cross bar is circular in section, and the radius of said web bearing surface substantially coincides with the radius of said cross bar.

References Cited

UNITED STATES PATENTS

| 1,397,131 | 11/1921 | Law _____ | 198—189 |
| 1,453,088 | 4/1923 | Bachman _____ | 198—189 |
| 1,687,005 | 10/1928 | Brock _____ | 198—189 |
| 2,860,520 | 11/1958 | Sull _____ | 59—85 |

FOREIGN PATENTS 360,026    3/1962    Switzerland.

CHARLES W. LANHAM, Primary Examiner

G. P. CROSBY, Assistant Examiner

U.S. Cl. X.R.

74—254; 198—189